(12) United States Patent
Zhang

(10) Patent No.: US 10,212,090 B2
(45) Date of Patent: Feb. 19, 2019

(54) POLICY CONTROL METHOD AND RELATED APPARATUS AND SYSTEM

(71) Applicant: Huawei Technologies Co., Ltd., Shenzhen (CN)

(72) Inventor: Aiqin Zhang, Shanghai (CN)

(73) Assignee: Huawei Technologies Co., Ltd., Shenzhen (CN)

(*) Notice: Subject to any disclaimer, the term of this patent is extended or adjusted under 35 U.S.C. 154(b) by 75 days.

(21) Appl. No.: 14/939,758

(22) Filed: Nov. 12, 2015

(65) Prior Publication Data

US 2016/0065481 A1   Mar. 3, 2016

Related U.S. Application Data

(63) Continuation of application No. PCT/CN2013/075911, filed on May 20, 2013.

(51) Int. Cl.

| | |
|---|---|
| *H04L 12/813* | (2013.01) |
| *H04W 76/12* | (2018.01) |
| *H04W 76/02* | (2009.01) |
| *H04L 12/24* | (2006.01) |
| *H04M 15/00* | (2006.01) |

(Continued)

(52) U.S. Cl.
CPC ............ *H04L 47/20* (2013.01); *H04L 12/407* (2013.01); *H04L 12/6418* (2013.01);
(Continued)

(58) Field of Classification Search
CPC . H04L 47/20; H04L 12/1407; H04L 41/0893; H04L 65/1069; H04L 65/1036
See application file for complete search history.

(56) References Cited

U.S. PATENT DOCUMENTS

2010/0195616 A1* 8/2010 Vikberg ............ H04W 36/0022
                                                              370/331
2012/0158995 A1* 6/2012 McNamee .............. H04L 45/24
                                                              709/238
(Continued)

FOREIGN PATENT DOCUMENTS

| CN | 101483848 A | 7/2009 |
|---|---|---|
| CN | 102148689 A | 8/2011 |
| CN | 102638867 A | 8/2012 |

OTHER PUBLICATIONS

"$3^{rd}$ Generation Partnership Project; Technical Specification Group Core Network and Terminals; Policy and Charging Control (PCC); Reference points (Release 12)," 3GPP TS 29.212, V12.0.0, pp. 1-198, $3^{rd}$ Generation Partnership Project, Valbonne, France (Mar. 2013).

*Primary Examiner* — Khaled M Kassim
*Assistant Examiner* — Syed Ali
(74) *Attorney, Agent, or Firm* — Leydig, Voit & Mayer, Ltd.

(57) ABSTRACT

This application discloses a policy control method, including: after a gateway is connected to a network, receiving a first gateway access identifier; selecting a PCRF entity for the gateway accordingly, and establishing a first session for the gateway to implement policy control on the gateway; when a mobile terminal or a fixed-line device is connected to the network through the gateway to perform service data flow access, receiving a second gateway access identifier; if the second gateway access identifier and the first gateway access identifier are the same, selecting, for a service data flow of the mobile terminal or the fixed-line device, a same PCRF entity, and establishing a second session to implement policy control on the service data flow of the mobile terminal or the fixed-line device. The foregoing manner is used to prevent incorrect policy control from causing an exception.

3 Claims, 7 Drawing Sheets

(51) Int. Cl.
*H04L 12/66* (2006.01)
*H04L 29/06* (2006.01)
*H04L 12/407* (2006.01)
*H04L 12/64* (2006.01)

(52) U.S. Cl.
CPC .......... *H04L 12/66* (2013.01); *H04L 41/0893* (2013.01); *H04L 65/1036* (2013.01); *H04L 65/1069* (2013.01); *H04M 15/62* (2013.01); *H04M 15/66* (2013.01); *H04W 76/022* (2013.01); *H04W 76/12* (2018.02)

(56) References Cited

U.S. PATENT DOCUMENTS

| | | | |
|---|---|---|---|
| 2012/0297076 A1 | 11/2012 | Wu et al. | |
| 2013/0242903 A1* | 9/2013 | Narkar | H04W 72/087 370/329 |
| 2013/0260711 A1* | 10/2013 | Shaikh | H04L 65/1016 455/405 |
| 2013/0343269 A1* | 12/2013 | Evans | H04W 40/02 370/328 |
| 2014/0169330 A1* | 6/2014 | Rommer | H04W 36/08 370/331 |
| 2014/0181312 A1* | 6/2014 | Rutten | H04L 65/1016 709/227 |
| 2014/0378131 A1* | 12/2014 | Rui | H04W 76/022 455/433 |
| 2015/0181033 A1* | 6/2015 | Keller | H04L 65/1016 455/404.1 |
| 2015/0189637 A1* | 7/2015 | Zhou | H04W 76/045 370/231 |
| 2016/0037576 A1* | 2/2016 | Jeong | H04W 76/16 370/329 |
| 2016/0295298 A1* | 10/2016 | Lee | H04N 21/23439 |
| 2018/0255463 A1* | 9/2018 | Zheng | H04W 16/02 |

* cited by examiner

POLICY CONTROL METHOD AND RELATED APPARATUS AND SYSTEM

CROSS-REFERENCE TO RELATED APPLICATIONS

This application is a continuation of International Patent Application No. PCT/CN2013/075911, filed on May 20, 2013, which is hereby incorporated by reference in its entirety.

TECHNICAL FIELD

This application relates to the field of communications, and in particular, to a policy control method and a related apparatus and system.

BACKGROUND

Currently, convergence of a fixed network and a mobile network (Fixed Mobile Convergence, FMC) is a trend. After convergence of a fixed network and a mobile network, in a residential unit, a mobile terminal and a fixed-line device (fixed device) may be both connected to a fixed-line gateway node by using a residential gateway. Therefore, both a data flow generated by the mobile terminal and a data flow generated by the fixed-line device need to pass through the residential gateway. As shown in FIG. 1, a data flow 1 that is generated as a mobile terminal activates a first access point, a data flow 2 generated as the mobile terminal activates a second access point, a data flow 3 generated as the mobile terminal performs local data access, and a data flow 4 generated by the fixed-line device all pass through a residential gateway 110, and all data flows (the data flow 1, the data flow 2, the data flow 3, and the data flow 4) that pass through the residential gateway are generally referred to as a data flow 5, and therefore, the data flows 1 to 5 are correlated.

To implement differentiated network services, a operator needs to perform policy control and charging on a data flow. The prior art provides a data flow control method, in which different policy and charging rules function (PCRF) entities are selected according to different terminal identifiers and access point identifiers (Access point Name, APN). It may been learned from the foregoing that, at least one of terminal identifiers and access point identifiers of the data flows 1 to 5 is different. For example, the data flow 1 and the data flow 2 have the same terminal identifiers, but have unique access point identifiers. Therefore, policy control is performed separately on the data flow 1 by using a PCRF entity 1, policy control is performed separately on the data flow 2 by using a PCRF entity 2, policy control is performed separately on the data flow 3 by using a PCRF entity 3, policy control is performed separately on the data flow 4 by using a PCRF entity 4, and policy control is performed separately on the data flow 5 by using a PCRF entity 5.

However, in such a manner, the PCRF entities are independent of each other. If a bandwidth originally occupied by the data flow 5 is 10 megabits, in which a bandwidth allocated to the data flow 1 is 6 megabits, when policy control on the data flow 5 by the PCRF entity 5 changes, that is, a bandwidth occupied by the data flow 5 is reduced from 10 megabits to 5 megabits, and the PCRF entity 1 does not know the change and therefore still performs policy control in accordance with 6 megabits, an exception occurs. For example, it cannot be ensured that the data flow 1 continues to obtain a bandwidth of 6 megabits, because the entire residential gateway can obtain only a bandwidth of 5 megabits. In this case, for the data flow 1, a bandwidth guaranteed for the data flow 1 by a network policy entity actually cannot be fulfilled. In addition, the data flow 1 distributes data packets at a rate of a bandwidth of 5 Mbit/s. Other data flows in the same residential gateway (Residential Gateway, RG), for example, the data flow 2, the data flow 3, and the data flow 4 still perform distribution in accordance with the original data flow rates (which are, for example, 2 Mbit/s, 1 Mbit/s, and 1 Mbit/s, respectively), that is, a data flow of 10 Mbit/s contends for a bandwidth of 5 Mbit/s, which definitely causes nearly a data packet loss of 50% of the entire residential gateway. The quality of service of a service provided for a user is quite low, and service experience of the user is also quite poor.

SUMMARY

A technical problem to be mainly resolved by this application is to provide a policy control method and a related apparatus and system, which can be used to select a same PCRF entity for correlated data flows or to perform correlated control on sessions under a same fixed-line access identifier (for example, an RG), thereby implementing same policy control and preventing incorrect policy control from causing an exception.

To resolve the foregoing technical problem, a first aspect of this application provides a policy control method, including the following steps: after a gateway is connected to a network, receiving a first gateway access identifier sent by the gateway; selecting a policy and charging rules function entity for the gateway according to the first gateway access identifier, and establishing a first session for the gateway to implement policy control on the gateway; when a mobile terminal or a fixed-line device is connected to the network through the gateway to perform service data flow access, receiving a second gateway access identifier sent by the gateway; and if the second gateway access identifier and the first gateway access identifier are the same and the first session established for the first gateway access identifier exists, sending an indication, selecting, for a service data flow of the mobile terminal or the fixed-line device, a policy and charging rules function entity that is the same as the policy and charging rules function entity selected by the gateway, and establishing a second session to implement policy control on the service data flow of the mobile terminal or the fixed-line device.

To resolve the foregoing technical problem, a second aspect of this application provides a policy control method, including the following steps: when a mobile terminal is connected to a network through a gateway to perform service data flow access, receiving a gateway access identifier of the gateway; and selecting, for the mobile terminal according to the gateway access identifier, a policy and charging rules function entity that is the same as a policy and charging rules function entity selected by the gateway.

To resolve the foregoing technical problem, a third aspect of this application provide a fixed-line gateway node, including: a first receiving module, a first selection module, a second receiving module, and a second selection module, where the first receiving module is configured to: after a gateway is connected to a network, receive a first gateway access identifier sent by the gateway, so that the first receiving module sends the first gateway access identifier to the first selection module; the first selection module is configured to receive the first gateway access identifier, select a policy and charging rules function entity for the gateway according to the first gateway access identifier, and establish a first session for the gateway to implement policy control on the gateway; the second receiving module receives, when a mobile terminal or a fixed-line device is connected to the network through the gateway to perform service data flow access, a second gateway access identifier sent by the gateway, so that the second receiving module sends the second gateway access identifier to the second selection module; and the second selection module receives the second gateway access identifier, and when the second gateway access identifier and the first gateway access identifier are the same and the first session established for the first gateway access identifier exists, sends an indication, selecting, for a service data flow of the mobile terminal or the fixed-line device, a policy and charging rules function entity that is the same as the policy and charging rules function entity selected by the gateway, and establishes a second session to implement policy control on the service data flow of the mobile terminal or the fixed-line device.

To resolve the foregoing technical problem, a fourth aspect of this application provides a packet data gateway, including: a receiving module and a selection module, where the receiving module is configured to: when a mobile terminal is connected to a network through a gateway to perform service data flow access, receive a gateway access identifier of the gateway, so that the receiving module sends the gateway access identifier to the selection module; and the selection module is configured to: receive the gateway access identifier, and select, according to the gateway access identifier for the mobile terminal, a policy and charging rules function entity that is the same as a policy and charging rules function entity selected by the gateway.

To resolve the foregoing technical problem, a fifth aspect of this application provides a fixed-line gateway node, including: a receiver and a processor, where the receiver is configured to: after a gateway is connected to a network, receive a first gateway access identifier sent by the gateway, and when a mobile terminal or a fixed-line device is connected to the network through the gateway to perform service data flow access, receive a second gateway access identifier sent by the gateway, so that the receiver sends the first gateway access identifier and the second gateway access identifier to the processor; and the processor is configured to receive the first gateway access identifier and the second gateway access identifier, select a policy and charging rules function entity for the gateway according to the first gateway access identifier, establish a first session for the gateway to implement policy control on the gateway, and when the second gateway access identifier and the first gateway access identifier are the same and the first session established for the first gateway access identifier exists, send an indication, select, for a service data flow of the mobile terminal or the fixed-line device, a policy and charging rules function entity that is the same as the policy and charging rules function entity selected by the gateway, and establish a second session to implement policy control on the service data flow of the mobile terminal or the fixed-line device.

To resolve the foregoing technical problem, a sixth aspect of this application provides a packet data gateway, including:

a receiver and a processor, where the receiver is configured to: when a mobile terminal is connected to a network through a gateway to perform service data flow access, receive a gateway access identifier of the gateway, so that the receiver sends the gateway access identifier to the processor; and the processor is configured to receive the gateway access identifier, and select, for the mobile terminal according to the gateway access identifier, a policy and charging rules function entity that is the same as a policy and charging rules function entity selected by the gateway.

To resolve the foregoing technical problem, a seventh aspect of this application provides a policy control system, including: a fixed-line gateway node and a packet data gateway, where the fixed-line gateway node communicates with the packet data gateway, and the fixed-line gateway node is any fixed-line gateway node in the foregoing.

To resolve the foregoing technical problem, an eighth aspect of this application provides a policy control method, including the following steps: receiving a session modification message sent by a first policy and charging rules function entity; modifying, according to the session modification message, a first session corresponding to the first policy and charging rules function entity to implement change of a control policy of the first policy and charging rules function entity; searching for a second session whose gateway access identifier is the same as a gateway access identifier of the first session; and sending a session modification notification to a second policy and charging rules function entity corresponding to the second session, so that the second policy and charging rules function entity determines, according to the session modification notification, whether to change a control policy of the second policy and charging rules function entity.

To resolve the foregoing technical problem, a ninth aspect of this application provides a fixed-line gateway node, including: a receiving module, a modifying module, a search module, and a sending module, where the receiving module is configured to receive a session modification message sent by a first policy and charging rules function entity, so that the receiving module sends the session modification message to the modifying module; the modifying module is configured to receive the session modification message, and modify, according to the session modification message, a first session corresponding to the first policy and charging rules function entity to implement change of a control policy of the first policy and charging rules function entity; and the search module is configured to search for a second session whose gateway access identifier is the same as a gateway access identifier of the first session; and the sending module is configured to send a session modification notification to a second policy and charging rules function entity corresponding to the second session, so that the second policy and charging rules function entity determines, according to the session modification notification, whether to change a control policy of the second policy and charging rules function entity.

To resolve the foregoing technical problem, a tenth aspect of this application provides a fixed-line gateway node, including: a receiver, a processor, and a sender, where the processor is separately connected to the receiver and the sender, and the receiver is configured to receive a session modification message sent by a first policy and charging rules function entity; the processor is configured to modify, according to the session modification message, a first session corresponding to the first policy and charging rules function entity to implement change of a control policy of the first policy and charging rules function entity, and search for a second session whose gateway access identifier is the same as a gateway access identifier of the first session; and the sender is configured to send a session modification notification to a second policy and charging rules function entity corresponding to the second session, so that the second policy and charging rules function entity determines, according to the session modification notification, whether to change a control policy of the second policy and charging rules function entity.

In the foregoing solutions, a gateway access identifier is used as a medium, so that a gateway, and a mobile terminal or a fixed-line device connected through the gateway select a same PCRF entity, and the same PCRF entity clearly knows a control status of correlated data flows that pass through the gateway; when one of the data flows changes, control policies are changed for correlated data flows affected by the data flow, thereby preventing incorrect policy control from causing an exception. Alternatively, correlated control is performed on sessions under a same fixed-line access identifier (for example, an RG), so that when one of the data flows changes, control policies are changed for correlated data flows affected by the data flow, thereby preventing incorrect policy control from causing an exception.

DESCRIPTION OF EMBODIMENTS

In the following description, to illustrate rather than limit, specific details such as a particular system structure, an interface, and a technology are provided to make a thorough understanding of the present invention. However, a person skilled in the art should know that the present invention may be implemented in other implementation manners without these specific details. In other cases, detailed descriptions of well-known apparatuses, circuits, and methods are omitted, so that the present invention is described without being obscured by unnecessary details.

Figure 1:
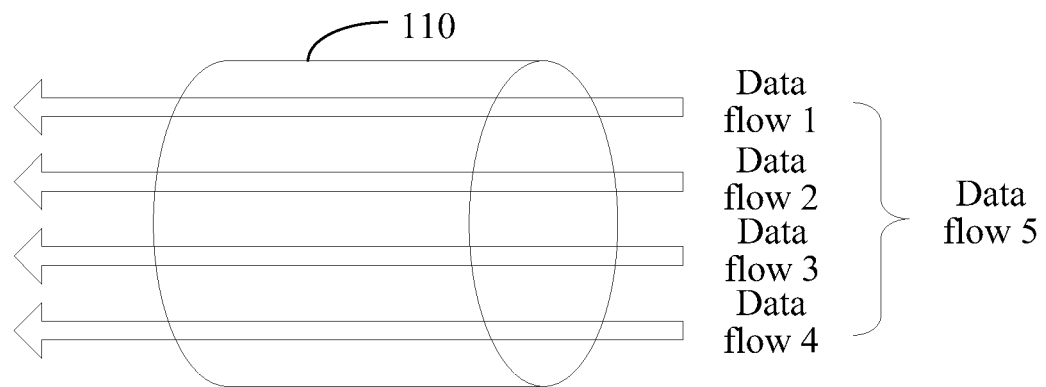
FIG. 1 is a diagram of relationships between data flows in the prior art.
Figure 2:
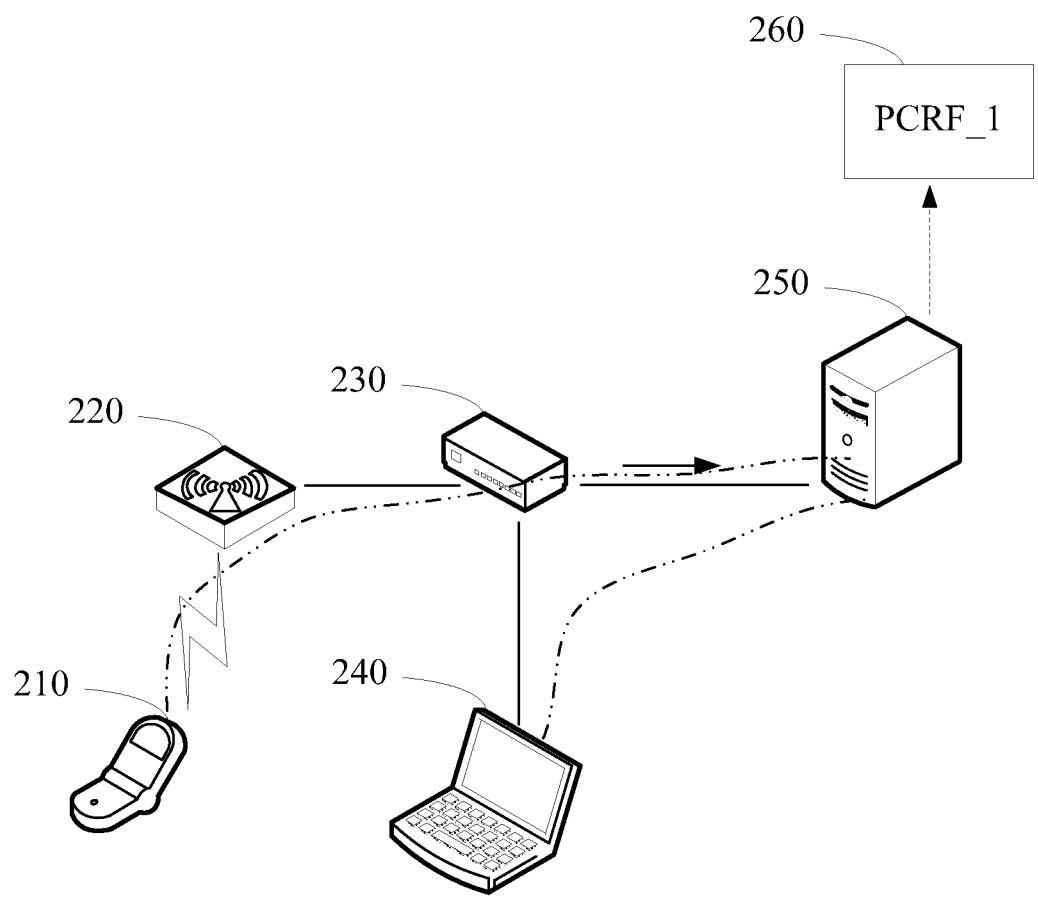
FIG. 2 is a schematic structural diagram of an implementation manner of a policy control system of this application.

Referring to FIG. 2, FIG. 2 is a schematic structural diagram of an implementation manner of a policy control system of this application. In this implementation manner, the policy control system includes: a mobile terminal 210, a wireless access point 220, a gateway 230, a fixed-line device 240, a fixed-line gateway node 250, and a PCRF entity 260. The mobile terminal 210 is a device, for example, a mobile phone, that can perform communication in a wireless manner, and the fixed-line device 240 is a device, for example, a fixed phone or a desktop computer, that performs communication in a wired manner. The fixed-line gateway node 250 includes: a broadband remote access server (BRAS) and a broadband network gateway (BNG). The PCRF entity 260 can perform policy control on traffic of the mobile terminal 210, the gateway 230, and the fixed-line device 240, and can perform charging according to traffic of the mobile terminal 210, the gateway 230 and the fixed-line device 240.

The mobile terminal 210 is connected to the gateway 230 by using the wireless access point 220, and the fixed-line device 240 is directly connected to the gateway 230. The gateway 230 is connected to the fixed-line gateway node 250, and the fixed-line gateway node 250 is connected to the PCRF entity 260.

When the gateway 230 is powered on, the gateway 230 sends a first gateway access identifier to the fixed-line gateway node 250, where the first gateway access identifier is an identifier of the gateway 230, where a same gateway has a same identifier, and different gateways have identifiers different from each other, and includes a gateway identifier, a line identifier, a network protocol address identifier, a virtual local area network identifier, or the like. After receiving the first gateway access identifier, the fixed-line gateway node 250 finds that the first gateway access identifier is a new gateway access identifier. The fixed-line gateway node 250 knows that no PCRF entity 260 has been allocated to the gateway 230, and therefore, the fixed-line gateway node 250 selects a PCRF entity 260 for the gateway 230 according to the first gateway access identifier, and establishes a first session for the gateway 230 to implement policy control on the gateway 230.

When the mobile terminal 210 performs data access by using the wireless access point 220, or the fixed-line device 240 performs data access, both the mobile terminal 210 and the fixed-line device 240 can perform data access only through the gateway 230, and therefore, the gateway 230 sends a second gateway access identifier to the fixed-line gateway node 250, where the second gateway access identifier includes a gateway identifier, a line identifier, a network protocol address identifier, a virtual local area network identifier, or the like. Apparently, the first gateway access identifier and the second gateway access identifier are the identifiers of the same gateway 230, and therefore, the first gateway access identifier and the second gateway access identifier are the same. The fixed-line gateway node 250 sends an indication to the PCRF entity 260, selects, for a service data flow of the mobile terminal 210 or the fixed-line device 240, a PCFR entity 260 that is the same as the PCRF entity 260 selected by the gateway 230, and establish a second session to implement policy control on the service data flow of the mobile terminal 210 or the fixed-line device 240.

Two manners of establishing a second session are included: (1) Modify the first session to obtain the second session to implement policy control on a service data flow of the mobile terminal 210 or the fixed-line device 240. (2) Maintain the first session to implement unchanged policy control on the gateway 230, and establish the second session to implement policy control on a data flow of the mobile terminal 210 or the fixed-line device 240.

It may be understood that, the same PCRF entity 260 is selected for the service data flow, passing through the gateway 230, of the mobile terminal 210 or the fixed-line device 240, and for the gateway 230, and therefore, when the service data flow that is generated by the mobile terminal 210 or the fixed-line device 240 and passes through the gateway 230 changes, the PCRF entity 260 may simultaneously change control policies for other affected data flows, thereby preventing incorrect policy control from causing an exception.

Figure 3:
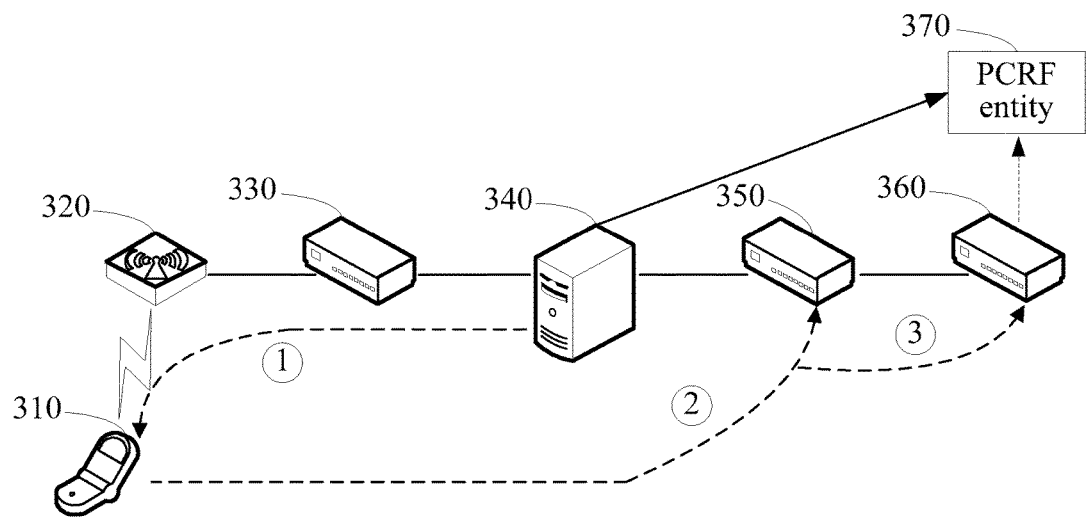
FIG. 3 is a schematic structural diagram of another implementation manner of a policy control system of this application.

Referring to FIG. 3, FIG. 3 is a schematic structural diagram of another implementation manner of a policy control system of this application. In this implementation manner, the policy control system includes: a mobile terminal 310, a wireless access point 320, a gateway 330, a fixed-line gateway node 340, an evolved packet data gateway 350, a packet data gateway 360, and a PCRF entity 370. The mobile terminal 310 is a device, for example, a mobile phone, that can perform communication in a wireless manner, and the fixed-line gateway node 340 includes: a BRAS and a BNG. The PCRF entity 370 can perform policy control on traffic of the mobile terminal 310 and the gateway 330, and can perform charging according to traffic of the mobile terminal 310 and the gateway 330.

The mobile terminal 310 is connected to the gateway 330 by using the wireless access point 320, the gateway 330 is connected to the fixed-line gateway node 340, the fixed-line gateway node 340 is connected to the evolved packet data gateway (ePDG) 350 and connected to the PCRF entity 370, the evolved packet data gateway 350 is connected to the packet data gateway (PDN-GW) 360, and the packet data gateway 360 is connected to the PCRF entity 370.

When the gateway 330 is powered on, the gateway 330 sends a first gateway access identifier to the fixed-line gateway node 340, where the first gateway access identifier is an identifier of the gateway 330, where a same gateway has a same identifier, and different gateways have identifiers different from each other, and includes a gateway identifier, a line identifier, a network protocol address identifier, a virtual local area network identifier, or the like. After receiving the first gateway access identifier, the fixed-line gateway node 340 finds that the first gateway access identifier is a new gateway access identifier. The fixed-line gateway node 340 knows that no PCRF entity 370 has been allocated to the gateway 330, and therefore, the fixed-line gateway node 340 selects a PCRF entity 370 for the gateway 330 according to the first gateway access identifier, and establishes a first session for the gateway 330 to implement policy control on the gateway 330.

In a scenario in which the mobile terminal 310 is connected to an EPC (Enhanced Packet Core) packet data network via a wireless local area network (WirelessLAN, WLAN) in an S2b manner, in the prior art, a PCRF entity is selected for the mobile terminal 310 by using the packet data gateway 360. This implementation manner inherits such a mechanism, and similarly, the packet data gateway 360 selects the PCRF entity 370 for the mobile terminal 310.

When the mobile terminal 310 performs data access by using the wireless access point 320, the mobile terminal 310 can perform data access only through the gateway 330, and therefore, the gateway 330 sends a second gateway access identifier to the fixed-line gateway node 340, where the second gateway access identifier includes a gateway identifier, a line identifier, a network protocol address identifier, a virtual local area network identifier, or the like. However, because only data transmission but no signaling transmission can be performed between the fixed-line gateway node 340 and the evolved packet data gateway 350, and the second gateway access identifier is carried in signaling, the fixed-line gateway node 340 cannot send the second gateway access identifier to the evolved packet data gateway 350, and the evolved packet data gateway 350 further cannot send the second gateway access identifier to the packet data gateway 360. Therefore, when the mobile terminal 310 is used to access a network, EAP (Extensible Authentication Protocol)-based access authentication needs to be performed on the mobile terminal 310. After authentication succeeds, according to a characteristic that the fixed-line gateway node 340 allocates a public IP address to the mobile terminal 310, the second gateway access identifier or a policy and charging rules function entity identifier is encapsulated into an EAP authentication message and sent to the mobile terminal 310, or when the public IP address is allocated to the mobile terminal 310, the second gateway access identifier or the policy and charging rules function entity identifier is sent together to the mobile terminal 310. The mobile terminal 310 sends the second gateway access identifier or the policy and charging rules function entity identifier to the evolved packet data gateway 350, and the evolved packet data gateway 350 then sends the second gateway access identifier or the policy and charging rules function entity identifier to the packet data gateway 360, so that the packet data gateway 360 selects, for the mobile terminal 310 according to the second gateway access identifier that is the same as the first gateway access identifier, or the policy and charging rules function entity identifier, the PCRF entity 370 that is the same as the PCRF entity selected by the gateway 330.

Two manners of establishing a second session are included: (1) Modify the first session to obtain the second session to implement policy control on a service data flow of the mobile terminal 310. (2) Maintain the first session to implement unchanged policy control on the gateway 330, and establish the second session to implement policy control on a data flow of the mobile terminal 310.

It may be understood that, the same PCRF entity 370 is selected for the service data flow, passing through the gateway 330, of the mobile terminal 310, and for the gateway 330, and therefore, when the service data flow that is generated by the mobile terminal 310 and passes through the gateway 330 changes, the PCRF entity 370 can simultaneously change control policies for other affected data flows, thereby preventing incorrect policy control from causing an exception.

Figure 4:
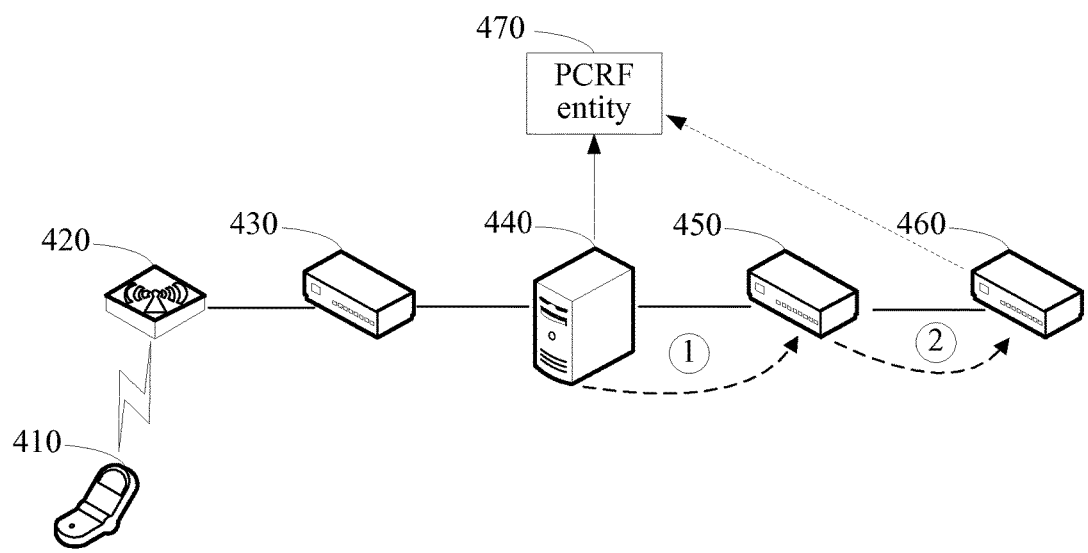
FIG. 4 is a schematic structural diagram of still another implementation manner of a policy control system of this application.

Referring to FIG. 4, FIG. 4 is a schematic structural diagram of still another implementation manner of a policy control system of this application. In this implementation manner, the policy control system includes: a mobile terminal 410, a wireless access point 420, a gateway 430, a fixed-line gateway node 440, a trusted wireless local area network access gateway (Trusted WLAN Access gateway, TWAG) 450, a packet data gateway 460, and a PCRF entity 470. The mobile terminal 410 is a device, for example, a mobile phone, that can perform communication in a wireless manner, and the fixed-line gateway node 440 includes: a BRAS and a BNG. The PCRF entity 470 can perform policy control on traffic of the mobile terminal 410 and the gateway 430, and can perform charging according to traffic of the mobile terminal 410 and the gateway 430.

The mobile terminal 410 is connected to the gateway 430 by using the wireless access point 420, the gateway 430 is connected to the fixed-line gateway node 440, the fixed-line gateway node 440 is connected to the trusted wireless local area network access gateway 450 and is connected to the PCRF entity 470, the trusted wireless local area network access gateway 450 is connected to the packet data gateway 460, and the packet data gateway 460 is connected to the PCRF entity 470.

When the gateway 430 is powered on, the gateway 430 sends a first gateway access identifier to the fixed-line gateway node 440, where the first gateway access identifier is an identifier of the gateway 430, where a same gateway has a same identifier, and different gateways have identifiers different from each other, and includes a gateway identifier, a line identifier, a network protocol address identifier, a virtual local area network identifier, or the like. After receiving the first gateway access identifier, the fixed-line gateway node 440 finds that the first gateway access identifier is a new gateway access identifier. The fixed-line gateway node 440 knows that no PCRF entity 470 has been allocated to the gateway 430, and therefore, the fixed-line gateway node 440 selects a PCRF entity 470 for the gateway 430 according to the first gateway access identifier, and establishes a first session for the gateway 430 to implement policy control on the gateway 430.

In a scenario in which the mobile terminal 410 is connected to an EPC by using an S2a-based wireless local area network, in the prior art, a PCRF entity is selected for the mobile terminal 410 by using the packet data gateway 460. This implementation manner inherits such a mechanism, and similarly, the packet data gateway 460 selects a PCRF entity for the mobile terminal 410.

When the mobile terminal 410 performs data access by using the wireless access point 420, the mobile terminal 410 can perform data access only through the gateway 430, and therefore, the gateway 430 sends a second gateway access identifier to the fixed-line gateway node 440, where the second gateway access identifier includes a gateway identifier, a line identifier, a network protocol address identifier, a virtual local area network identifier, or the like. Different from the previous implementation manner, both signaling transmission and data transmission can be performed between the fixed-line gateway node 440 and the trusted wireless local area network access gateway 450. Therefore, the fixed-line gateway node 440 sends the second gateway access identifier or a policy and charging rules function entity identifier to the trusted wireless local area network access gateway 450. The trusted wireless local area network access gateway 450 encapsulates the second gateway access identifier or the policy and charging rules function entity identifier into a Create Session Request or a Proxy Binding Update message, and sends the Create Session Request or the Proxy Binding Update message to the packet data gateway 460. The packet data gateway 460 selects, for the mobile terminal 410 according to the second gateway access identifier that is the same as the first gateway access identifier, or the policy and charging rules function entity identifier, the PCRF entity 470 that is the same as the PCRF entity selected by the gateway 430.

Two manners of establishing a second session are included: (1) Modify the first session to obtain the second session to implement policy control on a service data flow of the mobile terminal 410. (2) Maintain the first session to implement unchanged policy control on the gateway 430, and establish the second session to implement policy control on a data flow of the mobile terminal 410.

It may be understood that, the same PCRF entity 370 is selected for the service data flow, passing through the gateway 430, of the mobile terminal 410, and for the gateway 430, and therefore, when the service data flow that is generated by the mobile terminal 410 and passes through the gateway 430 changes, the PCRF entity 470 can simultaneously change control policies for other affected data flows, thereby preventing incorrect policy control from causing an exception.

Figure 5:
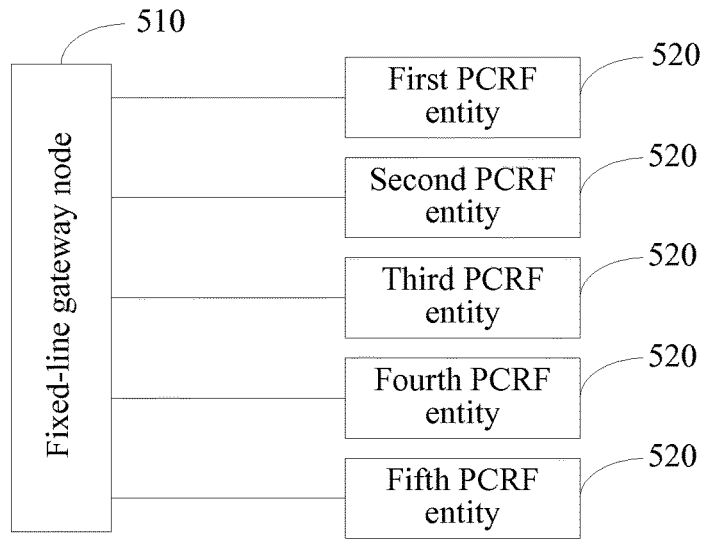
FIG. 5 is a schematic structural diagram of yet another implementation manner of a policy control system of this application.

Referring to FIG. 5, FIG. 5 is a schematic structural diagram of yet another implementation manner of a policy control system of this application. This implementation manner is similar to the prior art, where a fixed-line gateway node 510 selects different PCRF entities 520 for different data flows. However, in this embodiment, relationships may be established among the different PCRF entities 520, and when a control policy of one of the PCRF entities 520 changes, other PCRF entities 520 can learn such a change, thereby adjusting control policies of the other PCRF entities 520. For example, when a control policy of a first PCRF entity 520 changes, the first PCRF entity 520 sends a session modification message to the fixed-line gateway node 510. The fixed-line gateway node 510 receives the session modification message sent by the first PCRF entity 520. The fixed-line gateway node 510 changes, according to the session modification message, a first session corresponding to the first PCRF entity 520, to implement change of the control policy of the first PCRF entity 520. The fixed-line gateway node 510 searches for a second session whose gateway access identifier is the same as a gateway access identifier of the first session, and finds that gateway access identifiers of sessions between the second to the fifth PCRF entities 520 and the fixed-line gateway node 510 are the same as the gateway access identifier of the first session. The fixed-line gateway node 510 sends a session modification notification to the second to the fifth PCRF entities 520, so that the second to the fifth PCRF entities 520 determine, according to the session modification notification, whether to change control policies of the second to the fifth PCRF entities 520.

Figure 6:
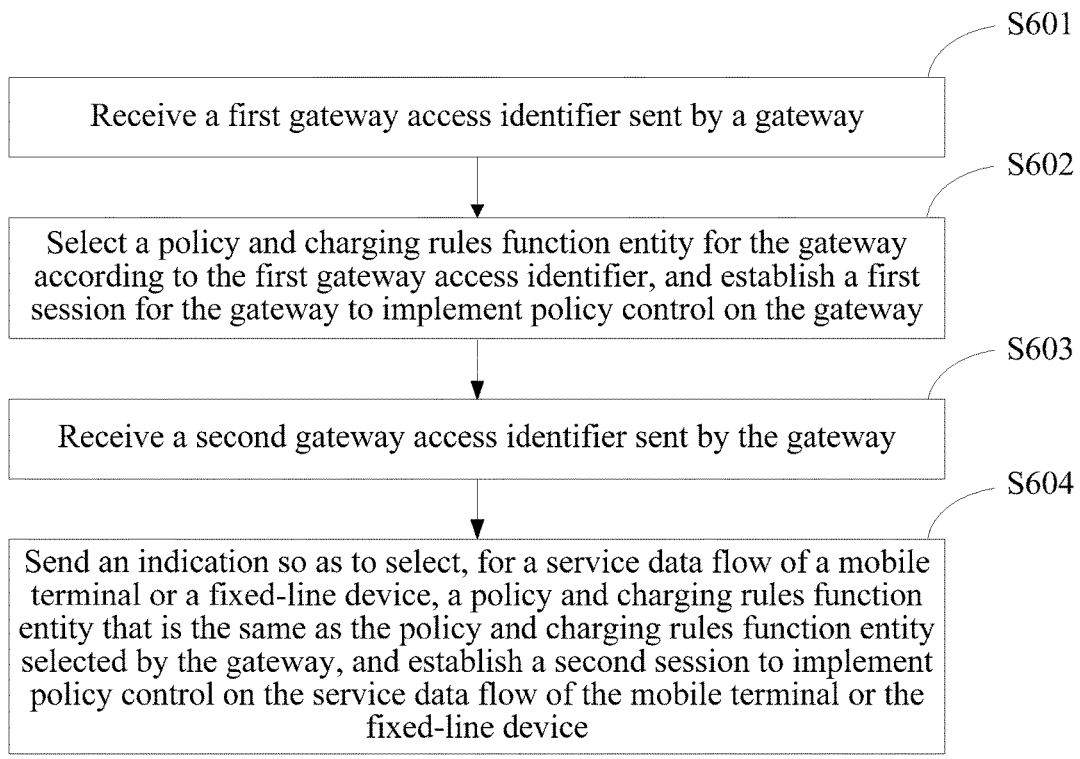
FIG. 6 is a flowchart of an implementation manner of a policy control method.

Referring to FIG. 6, FIG. 6 is a flowchart of an implementation manner of a policy control method. This implementation manner is described from the perspective of a fixed-line gateway node, and the policy control method in this implementation manner includes:

S601: The fixed-line gateway node receives a first gateway access identifier sent by a gateway. The first gateway access identifier is an identifier of the gateway, where a same gateway has a same identifier, and different gateways have identifiers different from each other, and includes a gateway identifier, a line identifier, a network protocol address identifier, a virtual local area network identifier, or the like.

When the gateway is powered on, the gateway is connected to a network, and the gateway sends the first gateway access identifier to the fixed-line gateway node. After the gateway is connected to the network, the fixed-line gateway node receives the first gateway access identifier sent by the gateway.

S602: The fixed-line gateway node selects a policy and charging rules function entity for the gateway according to the first gateway access identifier, and establishes a first session for the gateway to implement policy control on the gateway.

After receiving the first gateway access identifier, the fixed-line gateway node finds that the first gateway access identifier is a new gateway access identifier. The fixed-line gateway node knows that no PCRF entity has been allocated to the gateway, and therefore, the fixed-line gateway node selects a PCRF entity for the gateway according to the first gateway access identifier, and establishes the first session for the gateway to implement policy control on the gateway.

S603: When a mobile terminal or a fixed-line device is connected to a network through the gateway to perform service data flow access, the fixed-line gateway node receives a second gateway access identifier sent by the gateway. The second gateway access identifier is the identifier of the gateway, where a same gateway has a same identifier, and different gateways have identifiers different from each other, and includes a gateway identifier, a line identifier, a network protocol address identifier, a virtual local area network identifier, or the like.

If the mobile terminal or the fixed-line device is connected to the network through the gateway to perform service data flow access, the gateway sends the second gateway access identifier to the fixed-line gateway node. The fixed-line gateway node receives the second gateway access identifier sent by the gateway.

S604: The fixed-line gateway node sends an indication, selects, for a service data flow of the mobile terminal or the fixed-line device, a policy and charging rules function entity that is the same as the policy and charging rules function entity selected by the gateway, and establishes a second session to implement policy control on the service data flow of the mobile terminal or the fixed-line device.

If the second gateway access identifier and the first gateway access identifier are the same, it indicates that the first gateway access identifier and the second gateway access identifier are the identifier of the same gateway. In this case, if the first session established for the first gateway access identifier exists, the fixed-line gateway node sends an indication to a PCRF entity, selects, for the service data flow of the mobile terminal or the fixed-line device, a PCRF entity that is the same as a PCRF entity selected by the gateway, and establishes the second session to implement policy control on the service data flow of the mobile terminal or the fixed-line device.

In a scenario in which the mobile terminal is connected to an EPC packet data network via a WLAN in an S2b manner, when the mobile terminal is used to access a network, EAP-based access authentication needs to be performed on the mobile terminal. After authentication succeeds, according to a characteristic that the fixed-line gateway node allocates a public IP address to the mobile terminal, the second gateway access identifier or a policy and charging rules function entity identifier is encapsulated into an EAP authentication message, which is used as the indication sent by the fixed-line gateway node and is sent to the mobile terminal, or when the public IP address is allocated to the mobile terminal, the second gateway access identifier or the policy and charging rules function entity identifier is used as the indication sent by the fixed-line gateway node, and the indication is sent together to the mobile terminal. The mobile terminal sends the second gateway access identifier or the policy and charging rules function entity identifier to an evolved packet data gateway, and the evolved packet data gateway then sends the second gateway access identifier or the policy and charging rules function entity identifier to a packet data gateway, so that the packet data gateway selects, for the mobile terminal according to the second gateway access identifier that is the same as the first gateway access identifier, or the policy and charging rules function entity identifier, a PCRF entity that is the same as a PCRF entity selected by the gateway.

In a scenario in which the mobile terminal is connected to an EPC by using an S2a-based wireless local area network, the fixed-line gateway node uses the second gateway access identifier or a policy and charging rules function entity identifier as the indication sent by the fixed-line gateway node and sends the indication to a trusted wireless local area network access gateway. The trusted wireless local area network access gateway encapsulates the second gateway access identifier or the policy and charging rules function entity identifier into a Create Session Request or a Proxy Binding Update message, and sends the Create Session Request or the Proxy Binding Update message to a packet data gateway. The packet data gateway selects, for the mobile terminal according to the second gateway access identifier that is the same as the first gateway access identifier, or the policy and charging rules function entity identifier, a PCRF entity that is the same as a PCRF entity selected by the gateway.

Two manners of establishing a second session are included: (1) Modify the first session to obtain the second session to implement policy control on the service data flow of the mobile terminal. (2) Maintain the first session to implement unchanged policy control on the gateway, and establish the second session to implement policy control on a data flow of the mobile terminal.

Figure 7:
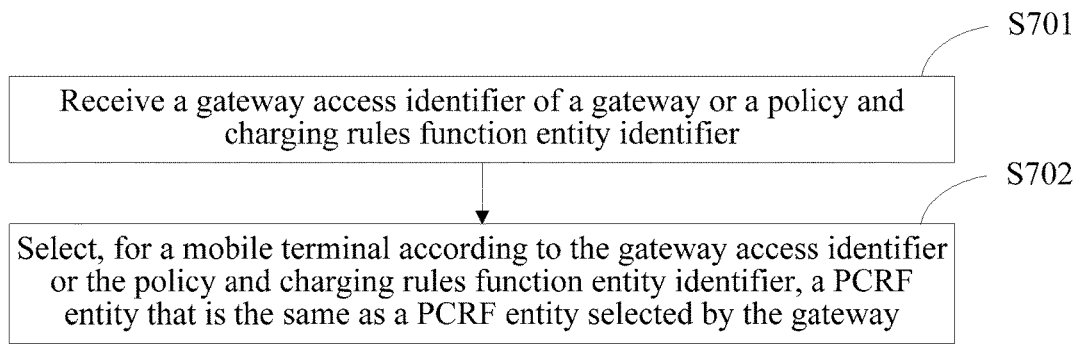
FIG. 7 is a flowchart of another implementation manner of a policy control method.

Referring to FIG. 7, FIG. 7 is a flowchart of another implementation manner of a policy control method. This implementation manner is described from the perspective of a packet data gateway, and the policy control method in this implementation manner includes:

S701: The packet data gateway receives a gateway access identifier of a gateway or a policy and charging rules function entity identifier. The gateway access identifier is an identifier of the gateway, where a same gateway has a same identifier, and different gateways have identifiers different from each other, and includes a gateway identifier, a line identifier, a network protocol address identifier, or a virtual local area network identifier. The policy and charging rules function entity identifier includes a domain name, an IP address, and the like of a policy and charging rules function entity.

In a scenario in which a mobile terminal is connected to an EPC packet data network via a WLAN in an S2b manner, when the mobile terminal is used to access a network, EAP-based access authentication needs to be performed on the mobile terminal. After authentication succeeds, according to a characteristic that a fixed-line gateway node allocates a public IP address to the mobile terminal, a second gateway access identifier or the policy and charging rules function entity identifier is encapsulated into an EAP authentication message, which is used as the indication sent by the fixed-line gateway node and is sent to the mobile terminal, or when the public IP address is allocated to the mobile terminal, the second gateway access identifier or the policy and charging rules function entity identifier is used as the indication sent by the fixed-line gateway node, and the indication is sent together to the mobile terminal. The mobile terminal sends the second gateway access identifier or the policy and charging rules function entity identifier to an evolved packet data gateway, and the evolved packet data gateway then sends the second gateway access identifier or the policy and charging rules function entity identifier to the packet data gateway. The packet data gateway receives the gateway access identifier or the policy and charging rules function entity identifier.

In a scenario in which the mobile terminal is connected to an EPC by using an S2a-based wireless local area network, the fixed-line gateway node uses the second gateway access identifier or the policy and charging rules function entity identifier as the indication sent by the fixed-line gateway node and sends the indication to a trusted wireless local area network access gateway. The trusted wireless local area network access gateway encapsulates the second gateway access identifier or the policy and charging rules function entity identifier into a Create Session Request or a Proxy Binding Update message, and sends the Create Session Request or the Proxy Binding Update message to the packet data gateway. The packet data gateway receives the gateway access identifier or the policy and charging rules function entity identifier.

S702: The packet data gateway selects, for a mobile terminal according to the gateway access identifier or the policy and charging rules function entity identifier, a PCRF entity that is the same as a PCRF entity selected by the gateway.

The packet data gateway selects, for the mobile terminal according to a second gateway access identifier that is the same as a first gateway access identifier, or the policy and charging rules function entity identifier, a PCRF entity that is the same as a PCRF entity selected by the gateway.

Figure 8:
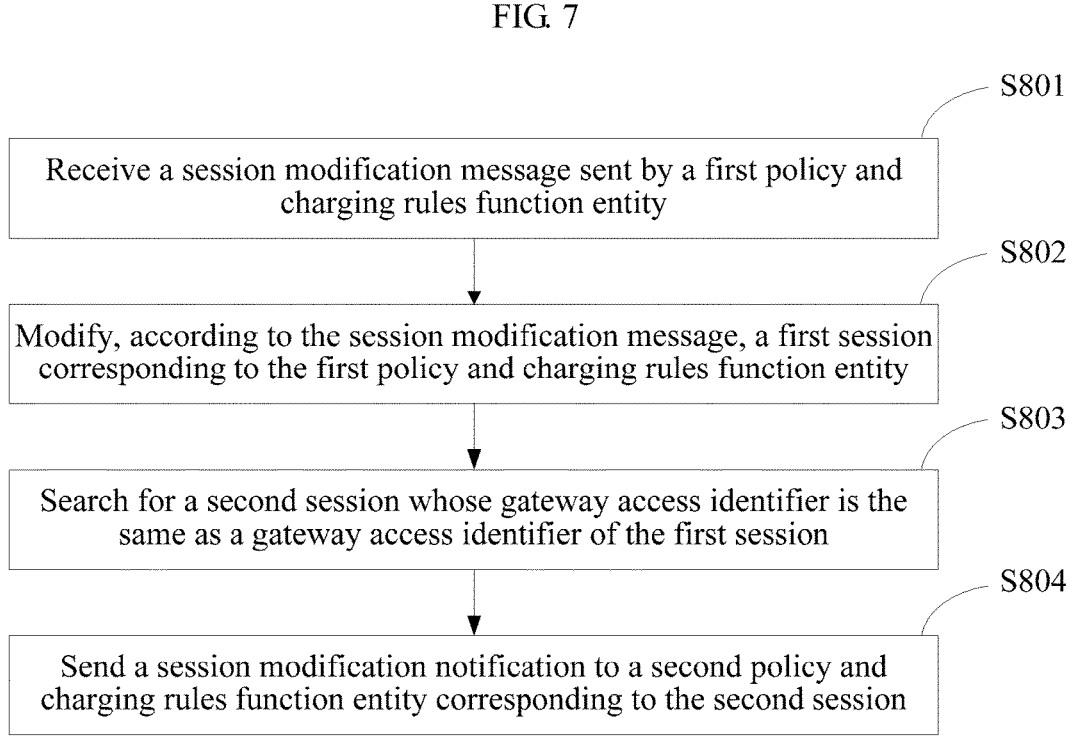
FIG. 8 is a flowchart of still another implementation manner of a policy control method.

Referring to FIG. 8, FIG. 8 is a flowchart of still another implementation manner of a policy control method. This implementation manner is described from the perspective of a fixed-line gateway node, and the policy control method in this implementation manner includes:

S801: The fixed-line gateway node receives a session modification message sent by a first policy and charging rules function entity.

When a control policy of the first PCRF entity changes, the first PCRF entity sends the session modification message to the fixed-line gateway node. The fixed-line gateway node receives the session modification message sent by the first PCRF entity.

S802: The fixed-line gateway node changes, according to the session modification message, a first session corresponding to the first policy and charging rules function entity. The first session includes an IP connectivity access network (IP-CAN) session and a gateway control session.

The fixed-line gateway node changes, according to the session modification message, the first session corresponding to the first PCRF entity, to implement change of a control policy of the first PCRF entity.

S803: The fixed-line gateway node searches for a second session whose gateway access identifier is the same as a gateway access identifier of the first session. The second session includes an IP connectivity access network session and a gateway control session.

S804: Send a session modification notification to a second policy and charging rules function entity corresponding to the second session.

If a second session whose gateway access identifier is the same as the gateway access identifier of the first session exists, the fixed-line gateway node sends the session modification notification to the second policy and charging rules function entity corresponding to the second session, so that the second policy and charging rules function entity determines, according to the session modification notification, whether to change a control policy of the second policy and charging rules function entity.

Figure 9:
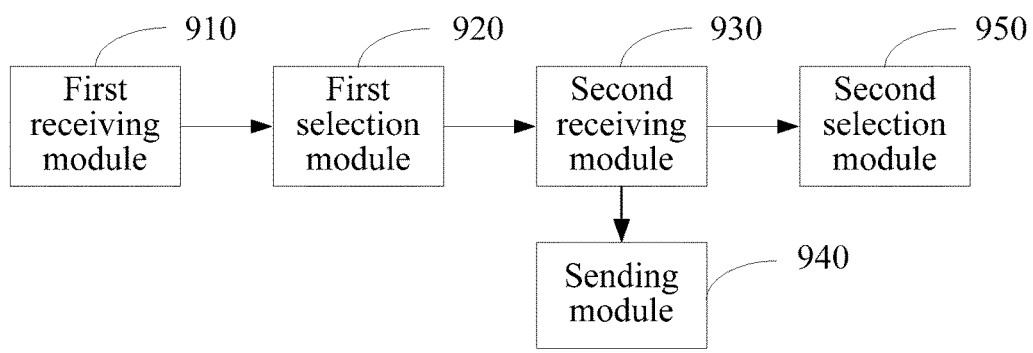
FIG. 9 is a schematic structural diagram of an implementation manner of a fixed-line gateway node.

Referring to FIG. 9, FIG. 9 is a schematic structural diagram of an implementation manner of a fixed-line gateway node. The fixed-line gateway node in this implementation manner includes: a first receiving module 910, a first selection module 920, a second receiving module 930, a sending module 940, and a second selection module 950.

The first receiving module 910 is configured to: after a gateway is connected to a network, receive a first gateway access identifier sent by the gateway. The first gateway access identifier is an identifier of the gateway, where a same gateway has a same identifier, and different gateways have identifiers different from each other, and includes a gateway identifier, a line identifier, a network protocol address identifier, a virtual local area network identifier, or the like. For example, when the gateway is powered on, the gateway is connected to the network, and the gateway sends the first gateway access identifier to the fixed-line gateway node. After the gateway is connected to the network, the first receiving module 910 receives the first gateway access identifier sent by the gateway. The first receiving module 910 sends the first gateway access identifier to the first selection module 920.

The first selection module 920 is configured to receive the first gateway access identifier, select a policy and charging rules function entity for the gateway according to the first gateway access identifier, and establish a first session for the gateway to implement policy control on the gateway. For example, after receiving the first gateway access identifier, the first receiving module 910 finds that the first gateway access identifier is a new gateway access identifier. The fixed-line gateway node knows that no PCRF entity has been allocated to the gateway, and therefore, the first selection module 920 selects a PCRF entity for the gateway according to the first gateway access identifier, and establishes the first session for the gateway to implement policy control on the gateway.

The second receiving module 930 is configured to: when a mobile terminal or a fixed-line device is connected to the network through the gateway to perform service data flow access, receive a second gateway access identifier sent by the gateway. The second gateway access identifier is the identifier of the gateway, where a same gateway has a same identifier, and different gateways have identifiers different from each other, and includes a gateway identifier, a line identifier, a network protocol address identifier, a virtual local area network identifier, or the like. For example, if the mobile terminal or the fixed-line device is connected to the network through the gateway to perform service data flow access, the gateway sends the second gateway access identifier to the fixed-line gateway node. The second receiving module 930 receives the second gateway access identifier sent by the gateway. The second receiving module 930 sends the second gateway access identifier to the second selection module 950.

The sending module 940 is configured to send the second gateway access identifier to the mobile terminal, so that the mobile terminal sends the second gateway access identifier or a policy and charging rules function entity identifier to an evolved packet data gateway, and after receiving the second gateway access identifier or the policy and charging rules function entity identifier, the evolved packet data gateway sends the second gateway access identifier or the policy and charging rules function entity identifier to a packet data gateway, so that the packet data gateway selects, for the mobile terminal according to the second gateway access identifier or the policy and charging rules function entity identifier, a policy and charging rules function entity that is the same as the policy and charging rules function entity selected by the gateway. For example, in a scenario in which the mobile terminal is connected to an EPC packet data network via a WLAN in an S2b manner, when the mobile terminal is used to access a network, EAP-based access authentication needs to be performed on the mobile terminal. After authentication succeeds, according to a characteristic that the fixed-line gateway node allocates a public IP address to the mobile terminal, the sending module 940 encapsulates the second gateway access identifier or the policy and charging rules function entity identifier into an EAP authentication message as the indication sent by the fixed-line gateway node, and sends the indication to the mobile terminal, or when the public IP address is allocated to the mobile terminal, uses the second gateway access identifier or the policy and charging rules function entity identifier as the indication sent by the fixed-line gateway node, and sends the indication together to the mobile terminal. The mobile terminal sends the second gateway access identifier or the policy and charging rules function entity identifier to the evolved packet data gateway, and the evolved packet data gateway then sends the second gateway access identifier or the policy and charging rules function entity identifier to the packet data gateway, so that the packet data gateway selects, for the mobile terminal according to the second gateway access identifier that is the same as the first gateway access identifier, or the policy and charging rules function entity identifier, a PCRF entity that is the same as the PCRF selected by the gateway.

The second selection module 950 is configured to receive the second gateway access identifier, and when the second gateway access identifier and the first gateway access identifier are the same and the first session established for the first gateway access identifier exists, send an indication, select, for a service data flow of the mobile terminal or the fixed-line device, the policy and charging rules function entity that is the same as the policy and charging rules function entity selected by the gateway, and establish a second session to implement policy control on the service data flow of the mobile terminal or the fixed-line device.

The sending module 940 is further configured to send the second gateway access identifier or the policy and charging rules function entity identifier to a trusted wireless local area network access gateway, so that the trusted wireless local area network access gateway sends the second gateway access identifier or the policy and charging rules function entity identifier to the packet data gateway, so that the packet data gateway selects, for the mobile terminal according to the second gateway access identifier or the policy and charging rules function entity identifier, the policy and charging rules function entity that is the same as the policy and charging rules function entity selected by the gateway. For example, in a scenario in which the mobile terminal is connected an EPC by using an S2a-based wireless local area network, the sending module 940 uses the second gateway access identifier or the policy and charging rules function entity identifier as the indication sent by the fixed-line gateway node, and sends the indication to the trusted wireless local area network access gateway. The trusted wireless local area network access gateway encapsulates the second gateway access identifier or the policy and charging rules function entity identifier into a Create Session Request or a Proxy Binding Update message, and sends the Create Session Request or the Proxy Binding Update message to the packet data gateway. The packet data gateway selects, for the mobile terminal according to the second gateway access identifier that is the same as the first gateway access identifier, or the policy and charging rules function entity identifier, a PCRF entity that is the same as a PCRF entity selected by the gateway.

Two manners of establishing a second session by the second selection module 950 are included: (1) Modify the first session to obtain the second session to implement policy control on a service data flow of the mobile terminal. (2) Maintain the first session to implement unchanged policy control on the gateway, and establish the second session to implement policy control on a data flow of the mobile terminal. For example, if the second gateway access identifier and the first gateway access identifier are the same, it indicates that the first gateway access identifier and the second gateway access identifier are the identifier of the same gateway. The fixed-line gateway node sends an indication to a PCRF entity, and selects, for the service data flow of the mobile terminal or the fixed-line device, a PCRF entity that is the same as a PCRF entity selected by the gateway, and establishes the second session to implement policy control on the service data flow of the mobile terminal or the fixed-line device.

Figure 10:
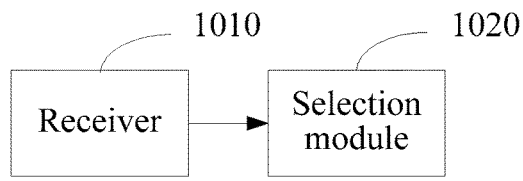
FIG. 10 is a schematic structural diagram of an implementation manner of a packet data gateway.

Referring to FIG. 10, FIG. 10 is a schematic structural diagram of an implementation manner of a packet data gateway. The packet data gateway in this implementation manner includes: a receiving module 1010 and a selection module 1020.

The receiving module 1010 is configured to: when a mobile terminal is connected to a network through a gateway to perform service data flow access, receive a gateway access identifier of the gateway or a policy and charging rules function entity identifier. The gateway access identifier includes a gateway identifier, a line identifier, a network protocol address identifier, or a virtual local area network identifier. The policy and charging rules function entity identifier includes a domain name, an IP address, and the like of a policy and charging rules function entity. For example, in a scenario in which the mobile terminal is connected to an EPC packet data network via a wireless local area network in an S2b manner, when the mobile terminal is used to access a network, EAP-based access authentication needs to be performed on the mobile terminal. After authentication succeeds, according to a characteristic that a fixed-line gateway node allocates a public IP address to the mobile terminal, a second gateway access identifier or the policy and charging rules function entity identifier is encapsulated into an EAP authentication message as the indication sent by the fixed-line gateway node, and the indication is sent to the mobile terminal, or when the public IP address is allocated to the mobile terminal, the second gateway access identifier or the policy and charging rules function entity identifier is used as the indication sent by the fixed-line gateway node, and the indication is sent together to the mobile terminal. The mobile terminal sends the second gateway access identifier or the policy and charging rules function entity identifier to an evolved packet data gateway, and the evolved packet data gateway then sends the second gateway access identifier or the policy and charging rules function entity identifier to the packet data gateway. The receiving module 1010 receives the gateway access identifier of the gateway or the policy and charging rules function entity identifier. Alternatively, in a scenario in which the mobile terminal is connected to an EPC by using an S2a-based wireless local area network, the fixed-line gateway node uses the second gateway access identifier or the policy and charging rules function entity identifier as the indication sent by the fixed-line gateway node, and sends the indication to a trusted wireless local area network access gateway. The trusted wireless local area network access gateway encapsulates the second gateway access identifier or the policy and charging rules function entity identifier into a Create Session Request or a Proxy Binding Update message, and sends the Create Session Request or the Proxy Binding Update message to the packet data gateway. The receiving module 1010 receives the gateway access identifier of the gateway or the policy and charging rules function entity identifier. The receiving module 1010 sends the gateway access identifier to the selection module 1020.

The selection module 1020 is configured to: receive the gateway access identifier or the policy and charging rules function entity identifier, and select, for the mobile terminal according to the gateway access identifier or the policy and charging rules function entity identifier, a policy and charging rules function entity that is the same as the policy and charging rules function entity selected by the gateway. For example, the selection module 1020 selects, for the mobile terminal according to the second gateway access identifier that is the same as a first gateway access identifier, or the policy and charging rules function entity identifier, a PCRF entity that is the same as the PCRF entity of the gateway.

Figure 11:
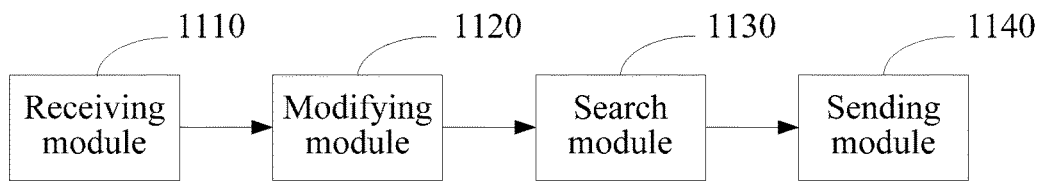
FIG. 11 is a schematic structural diagram of another implementation manner of a fixed-line gateway node.

Referring to FIG. 11, FIG. 11 is a schematic structural diagram of another implementation manner of a fixed-line gateway node. The fixed-line gateway node in this implementation manner includes: a receiving module 1110, a modifying module 1120, a search module 1130, and a sending module 1140.

The receiving module 1110 is configured to receive a session modification message sent by a first policy and charging rules function entity. For example, when a control policy of a first PCRF entity changes, the first PCRF entity sends the session modification message to the fixed-line gateway node. The receiving module 1110 receives the session modification message sent by the first PCRF entity. The receiving module 1110 sends the session modification message to the modifying module 1120.

The modifying module 1120 is configured to receive the session modification message, and modify, according to the session modification message, a first session corresponding to the first policy and charging rules function entity to implement change of a control policy of the first policy and charging rules function entity. The first session includes an IP connectivity access network session and a gateway control session. For example, the modifying module 1120 changes, according to the session modification message, the first session corresponding to the first PCRF entity, to implement change of the control policy of the first PCRF entity.

The search module 1130 is configured to search for a second session whose gateway access identifier is the same as a gateway access identifier of the first session. The second session includes an IP connectivity access network session and a gateway control session.

The sending module 1140 is configured to send a session modification notification to a second policy and charging rules function entity corresponding to the second session, so that the second policy and charging rules function entity determines, according to the session modification notification, whether to change a control policy of the second policy and charging rules function entity. For example, if a second session whose gateway access identifier is the same as the gateway access identifier of the first session exists, the sending module 1140 sends the session modification notification to the second policy and charging rules function entity corresponding to the second session, so that the second policy and charging rules function entity determines, according to the session modification notification, whether to change the control policy of the second policy and charging rules function entity.

Figure 12:
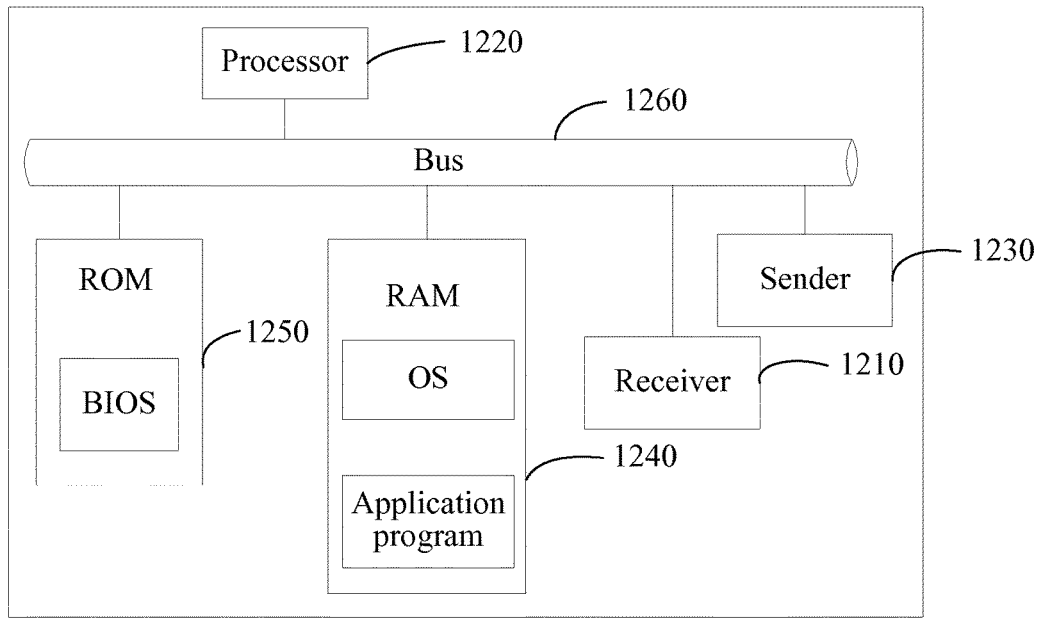
FIG. 12 is a schematic structural diagram of still another implementation manner of a fixed-line gateway node.

Referring to FIG. 12, FIG. 12 is a schematic structural diagram of still another implementation manner of a fixed-line gateway node. The fixed-line gateway node in this implementation manner includes: a receiver 1210, a processor 1220, a sender 1230, a random access memory 1240, a read-only memory 1250, and a bus 1260. The processor 1220 is separately coupled to the receiver 1210, the sender 1230, the random access memory 1240, and the read-only memory 1250 by using the bus 1260. When the fixed-line gateway node needs to be run, the fixed-line gateway node is started by using a basic input/output system built into the read-only memory 1250 or a bootloader boot system in an embedded system, so as to boot the fixed-line gateway node to enter a normal running state. After the fixed-line gateway node enters a normal running state, an application program and an operating system are run in the random access memory 1240, so that the following operations are performed:

The receiver 1210 is configured to: after a gateway is connected to a network, receive a first gateway access identifier sent by the gateway. The first gateway access identifier is an identifier of the gateway, where a same gateway has a same identifier, and different gateways have identifiers different from each other, and includes a gateway identifier, a line identifier, a network protocol address identifier, a virtual local area network identifier, or the like. For example, when the gateway is powered on, the gateway is connected to the network, and the gateway sends the first gateway access identifier to the fixed-line gateway node. After the gateway is connected to the network, the receiver 1210 receives the first gateway access identifier sent by the gateway. The receiver 1210 is further configured to: when a mobile terminal or a fixed-line device is connected to the network through the gateway to perform service data flow access, receive a second gateway access identifier sent by the gateway. The second gateway access identifier is the identifier of the gateway, where a same gateway has a same identifier, and different gateways have identifiers different from each other, and includes a gateway identifier, a line identifier, a network protocol address identifier, a virtual local area network identifier, or the like. For example, if the mobile terminal or the fixed-line device is connected to the network through the gateway to perform service data flow access, the gateway sends the second gateway access identifier to the fixed-line gateway node. The receiver 1210 receives the second gateway access identifier sent by the gateway.

The processor 1220 is configured to receive the first gateway access identifier, select a policy and charging rules function entity for the gateway according to the first gateway access identifier, and establish a first session for the gateway to implement policy control on the gateway. For example, after the first gateway access identifier is received, it is found that the first gateway access identifier is a new gateway access identifier. The fixed-line gateway node knows that no PCRF entity has been allocated to the gateway, and therefore, the processor 1220 selects a PCRF entity for the gateway according to the first gateway access identifier, and establishes the first session for the gateway to implement policy control on the gateway. The processor 1220 is further configured to receive the second gateway access identifier, and when the second gateway access identifier and the first gateway access identifier are the same, send an indication, select, for a service data flow of the mobile terminal or the fixed-line device, a policy and charging rules function entity that is the same as the policy and charging rules function entity selected by the gateway, and establish a second session to implement policy control on the service data flow of the mobile terminal or the fixed-line device. Two manners of establishing a second session by the processor 1220 are included: (1) Modify the first session to obtain the second session to implement policy control on the service data flow of the mobile terminal. (2) Maintain the first session to implement unchanged policy control on the gateway, and establish the second session to implement policy control on a data flow of the mobile terminal. For example, if the second gateway access identifier and the first gateway access identifier are the same, it indicates that the first gateway access identifier and the second gateway access identifier are the identifier of the same gateway. The fixed-line gateway node sends an indication to a PCRF entity, selects, for the service data flow of the mobile terminal or the fixed-line device, a PCRF entity that is the same as a PCRF entity selected by the gateway, and establishes the second session to implement policy control on the service data flow of the mobile terminal or the fixed-line device.

The sender 1230 is configured to send the second gateway access identifier or the policy and charging rules function entity identifier to the mobile terminal, so that the mobile terminal sends the second gateway access identifier or the policy and charging rules function entity identifier to an evolved packet data gateway, and after receiving the second gateway access identifier or the policy and charging rules function entity identifier, the evolved packet data gateway sends the second gateway access identifier or the policy and charging rules function entity identifier to a packet data gateway, so that the packet data gateway selects, for the mobile terminal according to the second gateway access identifier or the policy and charging rules function entity identifier, the policy and charging rules function entity that is the same as the policy and charging rules function entity selected by the gateway. For example, in a scenario in which the mobile terminal is connected to an EPC packet data network via a wireless local area network in an S2b manner, when the mobile terminal is used to access a network, EAP-based access authentication needs to be performed on the mobile terminal. After authentication succeeds, according to a characteristic that the fixed-line gateway node allocates a public IP address to the mobile terminal, the sender 1230 encapsulates the second gateway access identifier or the policy and charging rules function entity identifier into an EAP authentication message as the indication sent by the fixed-line gateway node, and sends the indication to the mobile terminal, or when the public IP address is allocated to the mobile terminal, uses the second gateway access identifier or the policy and charging rules function entity identifier as the indication sent by the fixed-line gateway node, and sends the indication together to the mobile terminal. The mobile terminal sends the second gateway access identifier or the policy and charging rules function entity identifier to the evolved packet data gateway, and the evolved packet data gateway then sends the second gateway access identifier or the policy and charging rules function entity identifier to the packet data gateway, so that the packet data gateway selects, for the mobile terminal according to the second gateway access identifier that is the same as the first gateway access identifier, or the policy and charging rules function entity identifier, a PCRF entity that is the same as the PCRF entity selected by the gateway. The sender 1230 is further configured to send the second gateway access identifier or the policy and charging rules function entity identifier to a trusted wireless local area network access gateway, so that the trusted wireless local area network access gateway sends the second gateway access identifier or the policy and charging rules function entity identifier to the packet data gateway, so that the packet data gateway selects, for the mobile terminal according to the second gateway access identifier or the policy and charging rules function entity identifier, the policy and charging rules function entity that is the same as the policy and charging rules function entity selected by the gateway. For example, in a scenario in which the mobile terminal is connected to an EPC by using an S2a-based wireless local area network, the sender 1230 uses the second gateway access identifier or the policy and charging rules function entity identifier as the indication sent by the fixed-line gateway node, and sends the indication to the trusted wireless local area network access gateway. The trusted wireless local area network access gateway encapsulates the second gateway access identifier or the policy and charging rules function entity identifier into a Create Session Request or a Proxy Binding Update message, and sends the Create Session Request or the Proxy Binding Update message to the packet data gateway. The packet data gateway selects, for the mobile terminal according to the second gateway access identifier that is the same as the first gateway access identifier, or the policy and charging rules function entity identifier, a PCRF entity that is the same as a PCRF entity selected by the gateway.

Figure 13:
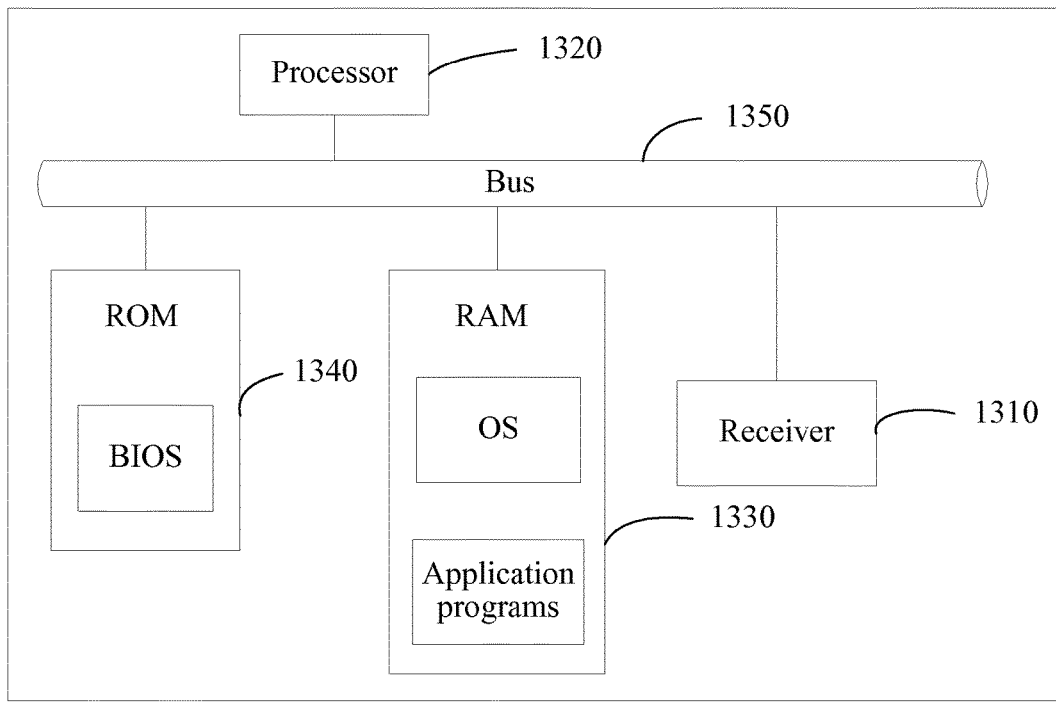
FIG. 13 is a schematic structural diagram of another implementation manner of a packet data gateway.

Referring to FIG. 13, FIG. 13 is a schematic structural diagram of another implementation manner of a packet data gateway. The packet data gateway in this implementation manner includes: a receiver 1310, a processor 1320, a random access memory 1330, a read-only memory 1340, and a bus 1350. The processor 1320 is separately coupled to the receiver 1310, the random access memory 1330, and the read-only memory 1340 by using the bus 1350. When the packet data gateway needs to be run, the packet data gateway is started by using a basic input/output system built into the read-only memory 1340 or a bootloader boot system in an embedded system, so as to boot the packet data gateway to enter a normal running state. After the packet data gateway enters a normal running state, an application program and an operating system are run in the random access memory 1330, so that the following operations are performed:

The receiver 1310 is configured to: when a mobile terminal is connected to a network through a gateway to perform service data flow access, receive a gateway access identifier of the gateway or a policy and charging rules function entity identifier. The gateway access identifier includes a gateway identifier, a line identifier, a network protocol address identifier, or a virtual local area network identifier. The policy and charging rules function entity identifier includes a domain name, an IP address, and the like of a policy and charging rules function entity. For example, in a scenario in which the mobile terminal is connected to an EPC packet data network via a wireless local area network in an S2b manner, when the mobile terminal is used to access a network, EAP-based access authentication needs to be performed on the mobile terminal. After authentication succeeds, according to a characteristic that a fixed-line gateway node allocates a public IP address to the mobile terminal, a second gateway access identifier or the policy and charging rules function entity identifier is encapsulated into an EAP authentication message as the indication sent by the fixed-line gateway node, and the indication is sent to the mobile terminal, or when the public IP address is allocated to the mobile terminal, the second gateway access identifier or the policy and charging rules function entity identifier is used as the indication sent by the fixed-line gateway node, and the indication is sent together to the mobile terminal. The mobile terminal sends the second gateway access identifier or the policy and charging rules function entity identifier to an evolved packet data gateway, and the evolved packet data gateway then sends the second gateway access identifier or the policy and charging rules function entity identifier to the packet data gateway. The receiver 1310 receives the gateway access identifier of the gateway or the policy and charging rules function entity identifier. Alternatively, in a scenario in which the mobile terminal is connected to an EPC by using an S2a-based wireless local area network, the fixed-line gateway node uses the second gateway access identifier or the policy and charging rules function entity identifier as the indication sent by the fixed-line gateway node, and sends the indication to a trusted wireless local area network access gateway. The trusted wireless local area network access gateway encapsulates the second gateway access identifier or the policy and charging rules function entity identifier into a Create Session Request or a Proxy Binding Update message, and sends the Create Session Request or the Proxy Binding Update message to the packet data gateway. The receiver 1310 receives the gateway access identifier of the gateway or the policy and charging rules function entity identifier. The receiver 1310 sends the gateway access identifier or the policy and charging rules function entity identifier to the processor 1320.

The processor 1320 is configured to: receive the gateway access identifier or the policy and charging rules function entity identifier, and select, for the mobile terminal according to the gateway access identifier or the policy and charging rules function entity identifier, a policy and charging rules function entity that is the same as the policy and charging rules function entity selected by the gateway. For example, the processor 1320 selects, for the mobile terminal according to the second gateway access identifier that is the same as the first gateway access identifier, or the policy and charging rules function entity identifier, a PCRF entity that is the same as a PCRF entity selected by the gateway.

Figure 14:
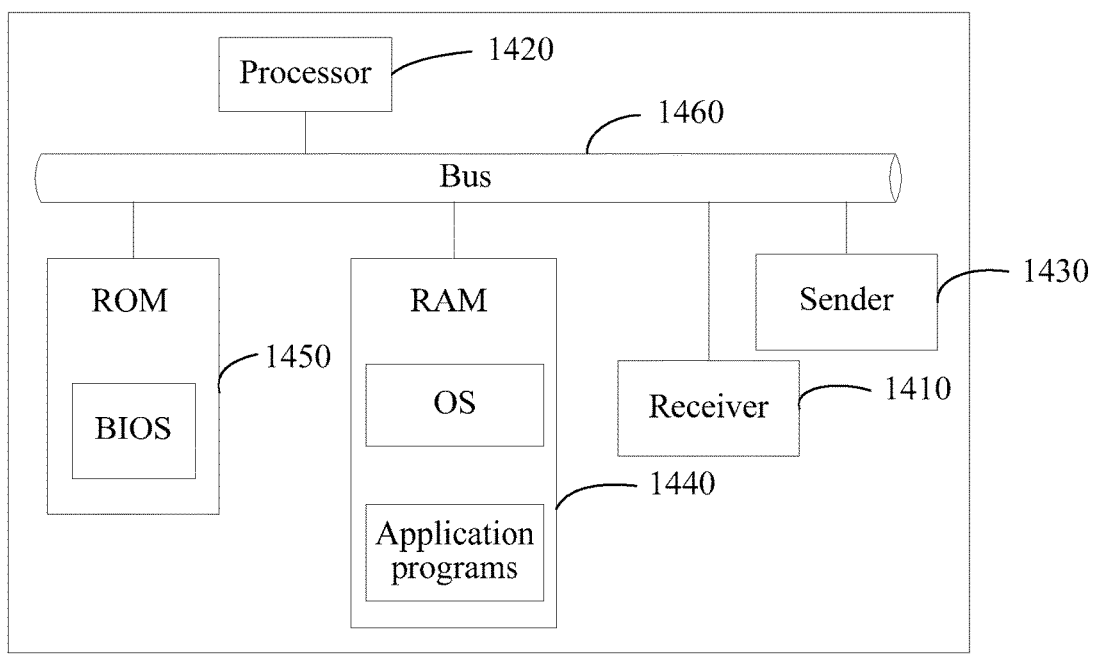
FIG. 14 is a schematic structural diagram of yet another implementation manner of a fixed-line gateway node.

Referring to FIG. 14, FIG. 14 is a schematic structural diagram of yet another implementation manner of a fixed-line gateway node. The fixed-line gateway node in this implementation manner includes: a receiver 1410, a processor 1420, a sender 1430, a random access memory 1440, a read-only memory 1450, and a bus 1460. The processor 1420 is separately coupled to the receiver 1410, the sender 1430, the random access memory 1440, and the read-only memory 1450 by using the bus 1460. When the fixed-line gateway node needs to be run, the fixed-line gateway node is started by using a basic input/output system built into the read-only memory 1450 or a bootloader boot system in an embedded system, so as to boot the fixed-line gateway node to enter a normal running state. After the fixed-line gateway node enters a normal running state, an application program and an operating system are run in the random access memory 1440, so that the following operations are performed:

The receiver 1410 is configured to receive a session modification message sent by a first policy and charging rules function entity. For example, when a control policy of a first PCRF entity changes, the first PCRF entity sends the session modification message to the fixed-line gateway node. The receiver 1410 receives the session modification message sent by the first PCRF entity. The receiver 1410 sends the session modification message to the processor 1420.

The processor 1420 is configured to: receive the session modification message, modify, according to the session modification message, a first session corresponding to the first policy and charging rules function entity to implement change of a control policy of the first policy and charging rules function entity, and search for a second session whose gateway access identifier is the same as a gateway access identifier of the first session. The first session includes an IP connectivity access network session and a gateway control session, and the second session includes an IP connectivity access network session and a gateway control session. For example, the processor 1420 modifies the first session corresponding to the first PCRF entity according to the session modification message, to implement change of the control policy of the first PCRF entity.

The sender 1430 is configured to send a session modification notification to a second policy and charging rules function entity corresponding to the second session, so that the second policy and charging rules function entity determines, according to the session modification notification, whether to change a control policy of the second policy and charging rules function entity. For example, if a second session whose gateway access identifier is the same as the gateway access identifier of the first session exists, the sender 1430 sends the session modification notification to the second policy and charging rules function entity corresponding to the second session, so that the second policy and charging rules function entity determines, according to the session modification notification, whether to change the control policy of the second policy and charging rules function entity.

Based the foregoing fixed-line gateway node and packet data gateway, this application further proposes a policy control system, including: a fixed-line gateway node and a packet data gateway, where the fixed-line gateway node communicates with the packet data gateway. For details, refer to FIG. 2 to FIG. 5 and related description, which is not described herein again.

In the foregoing solutions, a gateway access identifier is used as a medium, so that a gateway, and a mobile terminal or a fixed-line device connected through the gateway select a same PCRF entity, and the same PCRF entity clearly knows a control status of correlated data flows that pass through the gateway; when one of the data flows changes, control policies are changed for correlated data flows affected by the data flow, thereby preventing incorrect policy control from causing an exception. Alternatively, correlated control is performed on sessions under a same fixed-line access identifier (for example, an RG), so that when one of the data flows changes, control policies are changed for correlated data flows affected by the data flow, thereby preventing incorrect policy control from causing an exception.

In the several implementation manners provided in the present application, it should be understood that the disclosed system, apparatus, and method may be implemented in other manners. For example, the described apparatus embodiment is merely exemplary. For example, the module or unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the implementation manners.

In addition, functional units in the embodiments of the present application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present application essentially, or the part contributing to the prior art, or all or some of the technical solutions may be implemented in the form of a software product. The software product is stored in a storage medium and includes several instructions for instructing a computer device (which may be a personal computer, a server, or a network device) or a processor to perform all or some of the steps of the methods described in the embodiments of the present application. The foregoing storage medium includes: any medium that can store program code, such as a USB flash drive, a removable hard disk, a read-only memory (ROM), a random access memory (RAM,), a magnetic disk, or an optical disc.

What is claimed is:

1. A policy control method comprising:
   receiving, by a fixed-line gateway node for a network, a first gateway access identifier from a trusted wireless local area network access gateway (TWAG);
   selecting, by the fixed-line gateway node, a policy and charging rules function (PCRF) entity for the TWAG according to the first gateway access identifier;
   establishing, by the fixed-line gateway node, a first session for the TWAG to implement a first policy control on the TWAG when a mobile terminal or a fixed-line device is connected to the network through the TWAG to provide a first service data flow access to the network;
   receiving, by the fixed-line gateway node, a second gateway access identifier from the TWAG;
   sending, by the fixed-line gateway node, the first gateway access identifier or a first PCRF entity identifier to the mobile terminal or the fixed-line gateway node when the first and second gateway access identifiers are the same;
   sending, by the fixed-line gateway node, the second gateway access identifier or a second PCRF entity identifier to the TWAG, which forwards the second gateway access identifier or the second PCRF entity identifier to a packet data gateway;
   establishing, by the fixed-line gateway node, a second session for the TWAG to implement a second policy control on a second service data flow connected to the network through the TWAG, where the first and second policy controls are the same; and
   coordinating, by the fixed-line gateway node, changes in policy control at the TWAG for the first and second data flows in the first and second sessions, respectively.

2. A fixed-line gateway node comprising a transmitter, receiver and a processor, wherein
   the receiver is configured to cooperate with the processor to:
   a) receive a first gateway access identifier from a trusted wireless local area network access gateway (TWAG), and
   b) receive a second gateway access identifier from the TWAG when a mobile terminal or fixed-line gateway node is connected to a network through the TWAG to perform service data flow access; and
   the processor is configured to cooperate with the transmitter to:
   a) select a policy and charging rules function (PCRF) entity for the TWAG according to the first gateway access identifier,
   b) establish a first session for the TWAG to implement a first policy control on the TWAG,
   c) send the first gateway access identifier or a first PCRF entity identifier in a message to the mobile terminal or the fixed-line gateway node when the first and second gateway access identifiers are the same,
   d) send the second gateway access identifier or a second PCRF entity identifier to the TWAG, which forwards the second gateway access identifier or the second PCRF entity identifier to a packet data gateway;
   e) establish a second session for the TWAG to implement a second policy control on a second service data flow connected to the network through the TWAG, where the first and second policy controls are the same, and
   f) coordinate changes in policy control at the TWAG for the first and second data flows in the first and second sessions, respectively.

3. A packet data gateway comprising a receiver and a processor, wherein
   the receiver is configured to cooperate with the processor to:
   receive a first gateway access identifier of the gateway or a first policy and charging rules function (PCRF) entity identifier from trusted wireless local area network access gateway (TWAG) when a mobile terminal is connected to a network through a fixed-line gateway node to perform service data flow access,
   wherein the first gateway access identifier or the first PCRF entity identifier is received from the fixed-line gateway node by way of the mobile terminal;
   receive a second gateway access identifier or a second PCRF entity identifier sent from the TWAG,
   wherein the second gateway access identifier or the second PCRF entity identifier is received from the fixed-line gateway node to the TWAG, which further forwards the second gateway access identifier or the second PCRF entity identifier to the receiver; and
   the processor is configured to
   select, for the mobile terminal according to the first gateway access identifier or the second PCRF entity identifier, a first PCRF entity for providing first policy controls for a first session supporting a first service data flow servicing the mobile terminal, where the first PCRF is the same as the second PCRF supporting a second service data flow.

\* \* \* \* \*